United States Patent [19]
Hoenes

[11] Patent Number: 6,166,995
[45] Date of Patent: Dec. 26, 2000

[54] APPARATUS FOR DISTANCE MEASUREMENT BY MEANS OF ULTRASOUND

[75] Inventor: Frank Hoenes, Ditzingen, Germany

[73] Assignee: Robert Bosch GmbH, Stuttgart, Germany

[21] Appl. No.: 09/168,120

[22] Filed: Oct. 7, 1998

[30] Foreign Application Priority Data

Oct. 7, 1997 [DE] Germany .......................... 197 44 185

[51] Int. Cl.[7] ................................................ G01S 15/93
[52] U.S. Cl. ................................................ 367/99
[58] Field of Search ..................... 367/909, 99; 340/903, 340/904

[56] References Cited

U.S. PATENT DOCUMENTS

| | | | |
|---|---|---|---|
| 4,490,716 | 12/1984 | Tsuda et al. | 367/909 |
| 4,658,385 | 4/1987 | Tsuji | 367/909 |
| 5,572,484 | 11/1996 | Gaus et al. | 367/909 |

FOREIGN PATENT DOCUMENTS

| | | |
|---|---|---|
| 2 266 369 | 10/1993 | United Kingdom . |
| 2 291 501 | 1/1996 | United Kingdom . |
| 2 305 287 | 4/1997 | United Kingdom . |

*Primary Examiner*—Daniel T. Pihulic
*Attorney, Agent, or Firm*—Michael J. Striker

[57] ABSTRACT

The apparatus for measuring a distance to an object with ultrasound includes a number of ultrasonic transducers (1 to 10) arranged in a motor vehicle for propagation of ultrasonic pulses and a controller (13) including a device for controlling the ultrasonic transducers to sequentially propagate ultrasonic pulses from the respective ultrasonic transducers (1 to 10) and a device to simultaneously propagate ultrasonic pulses from each ultrasonic transducer so that the ultrasonic pulses from respective ultrasonic transducers are superimposed on each other when no obstacle is detected during sequentially propagating ultrasonic pulses, or according to a vehicle speed. Reflected ultrasonic pulses from an object near the vehicle are received by at least one of the ultrasonic transducers (1 to 10) after propagation of the ultrasonic pulses. An evaluation device evaluates the reflected ultrasonic pulses from the object and preferably activates warning devices for the driver as needed.

12 Claims, 3 Drawing Sheets

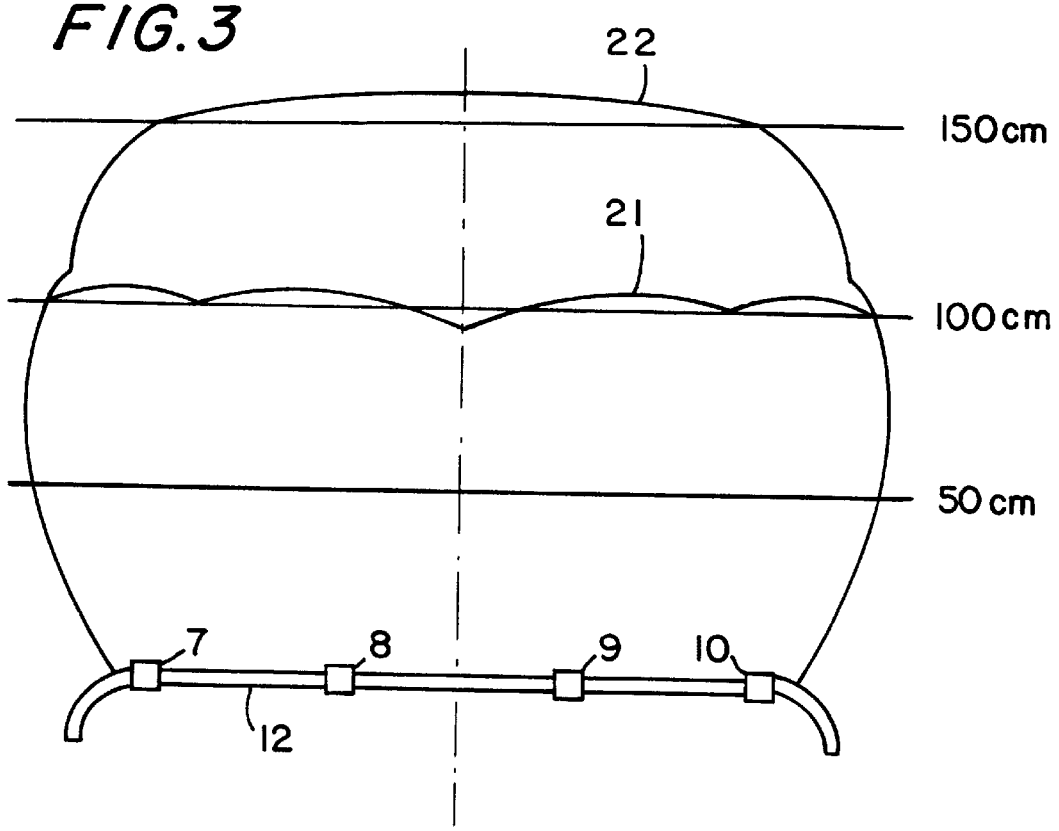
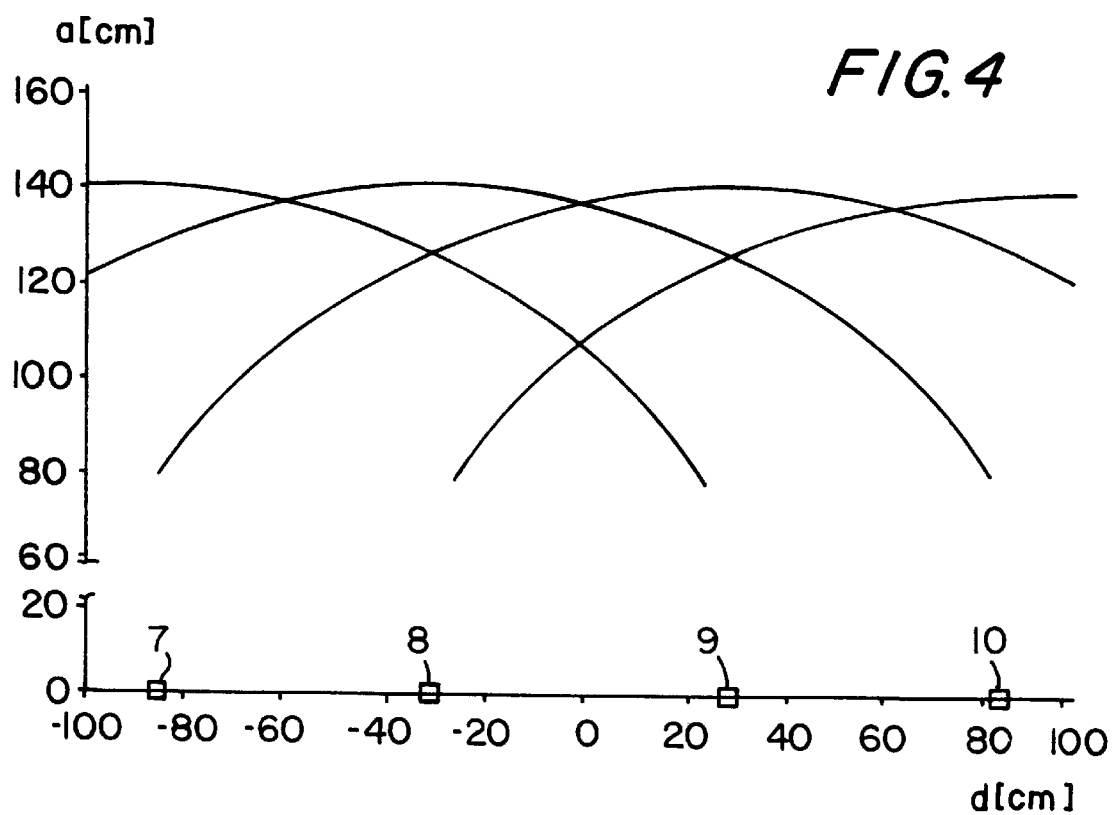

APPARATUS FOR DISTANCE MEASUREMENT BY MEANS OF ULTRASOUND

BACKGROUND OF THE INVENTION

1. Field of the Invention

The present invention relates to an apparatus for measuring distance with ultrasound with the aid of several ultrasonic transducers arranged preferably in a motor vehicle, in which the transit time of respective ultrasonic pulses from the ultrasonic transducers to an object and back is measured.

2. Prior Art

Ultrasonic distance measuring devices are used to an increased extent for detection of obstacles, especially in parking. This type of device comprises a control unit, which essentially contains a microcomputer with a suitable program, an ultrasonic transducer acting as a sensor and a suitable warning device. The ultrasonic transducer is, for example, arranged in the bumper.

The ultrasonic transducer propagates ultrasonic pulses when activated by the control unit. The device is then prepared to detect reflected echoes of the ultrasonic pulses. The distance to an obstacle or object is calculated from the transit time of the ultrasonic pulses from the ultrasonic transducer to the obstacle or object and back. The distance to the obstacle and/or a warning that the distance to the obstacle has dropped below a predetermined distance is reported optically and/or acoustically to the driver with the help of a connected warning device.

In the known devices sensors, namely the ultrasonic transducers, are assembled in groups which do not mutually interfere with each other because of the spatial arrangement in the bumper or in relation to the obstacle and are controlled simultaneously when ultrasonic pulses are propagated. The evaluation of the echoes in the known devices occurs continuously separately after transmission by the ultrasonic transducers. Usually the signals of the transmitting ultrasonic transducers (direct-echoes) and both ultrasonic transducers next to the transmitting ultrasonic transducers (cross-echoes) are evaluated. Thus not only the presence of an obstacle, but also its position and distance from the motor vehicle, can be determined with these known devices.

The sensitivity and thus the range of the ultrasonic distance measuring apparatus is determined essentially by the amplitude of the propagated ultrasonic pulses, the sensitivity of the receiver of the reflected ultrasonic pulses and the reflection properties of the obstacle. It is about a meter with the currently known devices. This range has been established in practice but is however also in many cases too small.

SUMMARY OF THE INVENTION

It is an object of the present invention to provide an apparatus for ultrasonic distance measurement of the above-described type that has a greater range than the currently known devices.

According to the invention, these objects are attained when respective ultrasonic pulse are propagated from several ultrasonic transducers simultaneously so that the ultrasonic pulses from the transducers are superimposed on each other and after that at least one of the ultrasonic transducers detects or receives reflections or echoes of the superimposed ultrasonic pulses.

If several ultrasonic transducers are simultaneously excited with the same signal, the sound waves are superimposed and are reinforced or reduced according to position. Since the obstacle is large in comparison to the wavelength, at least one maximum of the superimposed wave is reflected at the obstacle because of that. Because the features of the invention the range is increased, especially in the central region of the motor vehicle.

An increase in the range is already obtained in an embodiment including two ultrasonic transducers that simultaneously propagate ultrasonic pulses. In the apparatus according to the invention however preferably the ultrasonic transducers propagate all the ultrasonic pulses in essentially the same direction. However an ultrasonic transducer may be operated within the scope of the invention which does not propagate an ultrasonic pulse in the same direction as the other transducers. For example, an ultrasonic converter can be pointed forward or downward and laterally at a suitable aperture angle in order to increase the measurement range laterally or in a direction inclined downward or forward.

In one embodiment of the apparatus according to the invention ultrasonic pulses are sequentially propagated from the ultrasonic converter in addition to the simultaneous propagation of ultrasonic pulses. The reflections are received and evaluated. The apparatus according to the invention has both an increased,range and also a satisfactory position resolution because of these features.

In this embodiment the simultaneous propagation of ultrasonic pulses can occur alternately to the sequential propagation or the simultaneous propagation can occur when no obstacle is detected in the sequential propagation.

In the latter embodiment the simultaneous propagation only occurs when it is required. If an obstacle is already detected at a smaller distance only the sequential propagation occurs.

The range requirements are substantially speed dependent. Thus in an advantageous embodiment of the invention a change between sequential propagation and simultaneous propagation depends on the speed of the motor vehicle.

In an advantageous embodiment of the apparatus of the invention several ultrasonic transducers are arranged in the front part or the rear of the motor vehicle. In this embodiment these transducers are connected with a controller so that it controls and interrogates them individually and a program is provided in the controller so that a simultaneous group control can occur besides the individual control of the ultrasonic transducers.

In this embodiment operating parameters of the motor vehicle can be input to the controller. It is especially advantageous when the operating parameters can be input by means of a bus system, preferably by means of a CAN bus.

These operating parameters can, for example, be the vehicle speed, for the purpose of switching between the above-mentioned simultaneous and sequential operation. Furthermore an operating parameter can be a signal that indicates whether the vehicle lights are on or off and can be used to adjust the brightness of the optical warning elements accordingly. The operation of a distance-measuring device in the vehicle rear is evaluated especially with an attached trailer. Thus a signal of the attached trailer is conducted to the controller as an additional operating parameter, which leads to a shut down or to a switching of the rear distance measurement devices.

In order to obtain an effective increase of the range over the entire vehicle width, longer ultrasonic pulses have proven to be satisfactory. To detect close objects however shorter ultrasonic pulses are preferred. Thus in another embodiment of the invention, the duration of the ultrasonic pulses is larger in simultaneous propagation than in sequential propagation. A pulse duration of 600 microseconds has proven satisfactory for a ultrasonic pulse in simultaneous propagation and a duration of 300 microseconds has proven satisfactory for sequential propagation.

BRIEF DESCRIPTION OF THE DRAWING

The objects, features and advantages of the present invention will be explained in more detail by the following examples with reference to the drawing, in which

FIG. 3 is a block diagram of a part of the apparatus of FIG. 2 showing the increase in range obtained by the invention;

FIG. 4 is a graphical illustration of an ultrasonic wave front produced by simultaneous transmission of four ultrasonic transducers;

DESCRIPTION OF THE PREFERRED EMBODIMENTS

Figure 2:
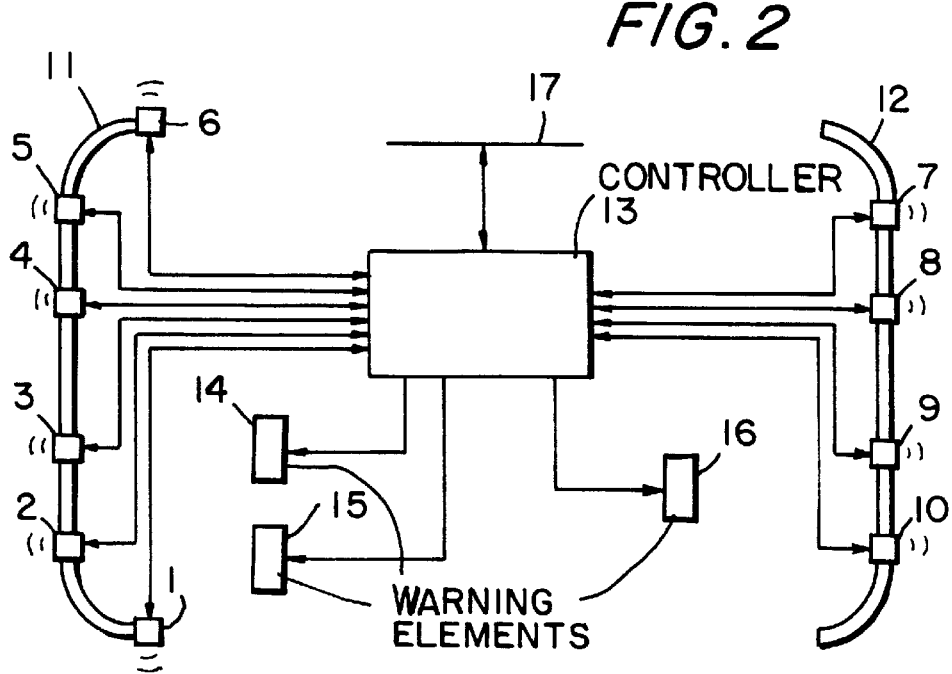
FIG. 2 is a block diagram of the apparatus for distance measurement according to the invention.

In the embodiment of the apparatus for distance measurement according to the invention shown in FIG. 2 six ultrasonic transducers 1 to 6 are arranged on the front bumper 11 of the vehicle. The rear bumper 12 carries four ultrasonic converters 7,8,9,10. The ultrasonic converters 1 to 10 for production of ultrasonic pulses are controlled by suitable signals from the controller 13. The ultrasonic transducers can be operated as transmitting or propagating transducers while they can also be operated as receiving transducers at other times receiving reflected signals that are conducted to the controller 13. Also the individual connections in the present example are bi-directional data conductors.

A description and illustration of the circuit for the ultrasonic transducer is not required for description of the invention. In the following the term "sensor" is used for the ultrasonic transducer with the respective circuit using the same reference number. Additional connections, such as for current supply of the sensor and the controller, are not shown in FIG. 2.

While the sensors 2, 3, 4, 5 are aligned in the travel direction and thus should signal the presence of obstacles in front of the motor vehicle, the sensors 1, 6 are pointed toward the respective sides of the vehicle in order to detect obstacles on the sides so that collisions are avoided during motion with the steering engaged.

The controller 13 is also connected with three warning elements 14, 15, 16 so that the warning elements 14 and 15 are arranged in the field of vision of the driver who is looking forward. On the other hand, the warning element 16 is visible to the driver who is looking toward the rear. The warning can occur optically or acoustically. The acoustic signal can be a high tone and/or a pulse/pause ratio with variable measured spacing or by different high tones, which can signal whether the detected obstacle is to the front or to the rear. Furthermore the controller 13 is connected with a CAN bus 17, by which it receives different operating parameters of the motor vehicle.

Figure 1:
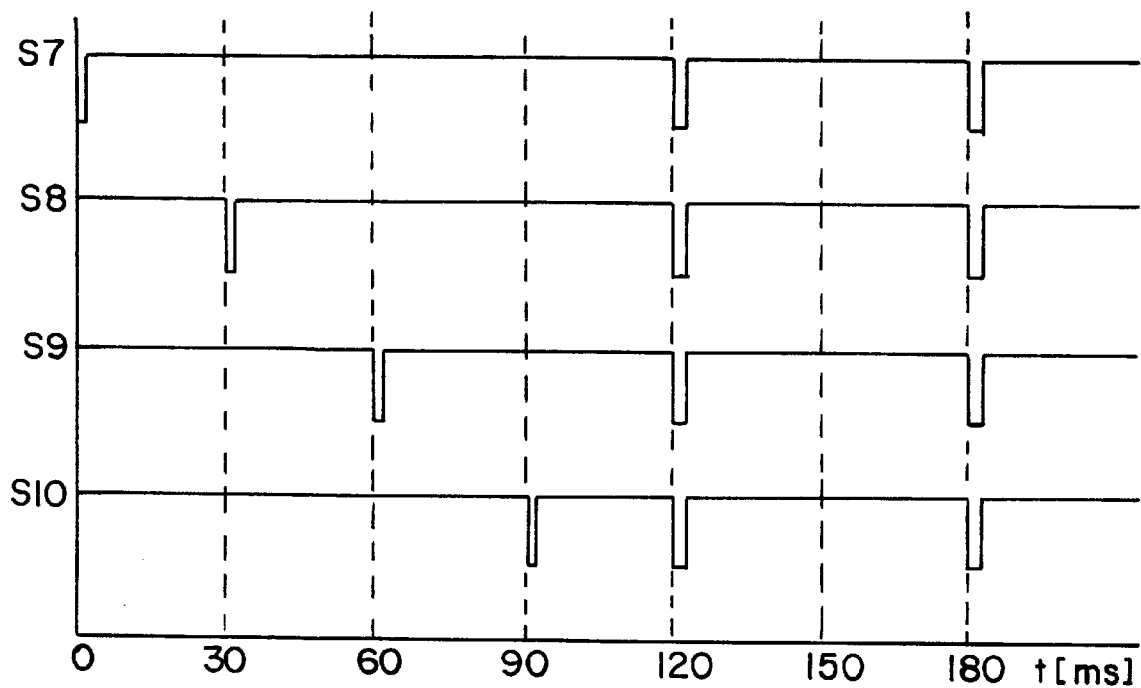
FIG. 1 is a timing diagram for the operation of four sensors in the apparatus according to the invention.

FIG. 1 shows schematically the time course of the control of the sensors 7, 8, 9 10(FIG. 2). The associated diagrams for the respective sensors are indicated with S7 to S10. The ultrasonic transducers generate ultrasonic pulses during the illustrated time interval shown on the figure. The ultrasonic transducers are connected to receive during the remaining time. The pulse length is shown larger than the actual length in order to make it more easily visible. The ultrasonic transducer is controlled during 30 ms of the time interval of from 0 ms to 120 ms. A transit time of the pulse to the object and back of 1 ms for each 17 cm distance results because the speed of sound is 330 m/s and because of the doubled path (to the object and back). In this embodiment however the time for propagation of the next ultrasonic pulse is expected to be substantially longer, namely almost 30 ms. Because of that interference by multiple echoes, for example in underground garages, should be avoided. A new measurement also begins when all echoes of this type are attenuated.

In this embodiment during sequential operation the pulse length was selected to be 300 $\mu$s and during simultaneous operation (during 120 ms and 180 ms) the pulse length was selected to be 600 $\mu$s. The shorter pulse length used in sequential operation takes into account that reception of the echoes should be as soon as possible for measurement of the shorter distances to the object. In this case however the attenuation or damping behavior of the ultrasonic transducer is troublesome. The full amplitude is not attained with the comparatively shorter pulse of 300 $\mu$s and a more rapid damping occurs.

In simultaneous operation the sensors 7 to 10 are controlled during 60 ms. Because of the high transmission power even 60 ms is expected until the next transmission in the illustrated embodiment in order to permit all possible multiple echoes to be damped.

FIG. 3 shows the rear bumper 12 with the sensors 7 to 10, a curve 21 indicating the range in sequential operation and a curve 22 indicating the range in simultaneous operation.

Figure 5:
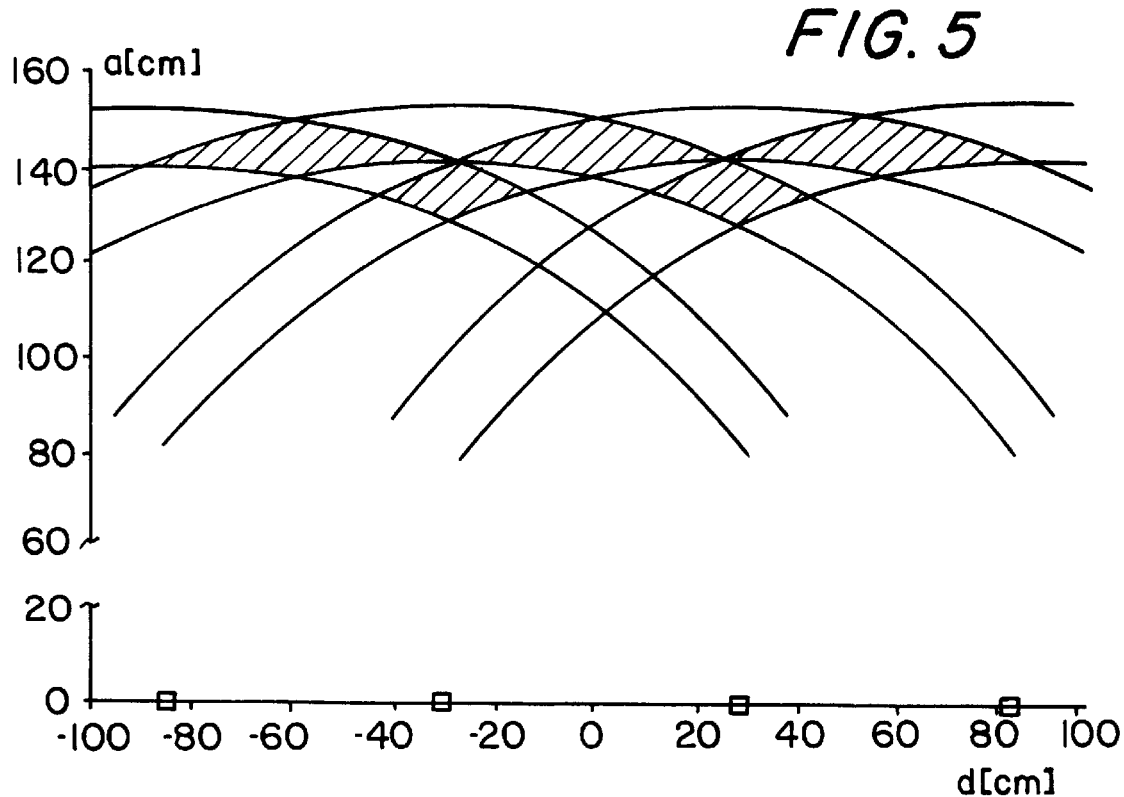
FIG. 5 is a graphical illustration of an ultrasonic wave front produced by simultaneous transmission of four ultrasonic transducers with a pulse duration of 300 $\mu$s.
Figure 6:
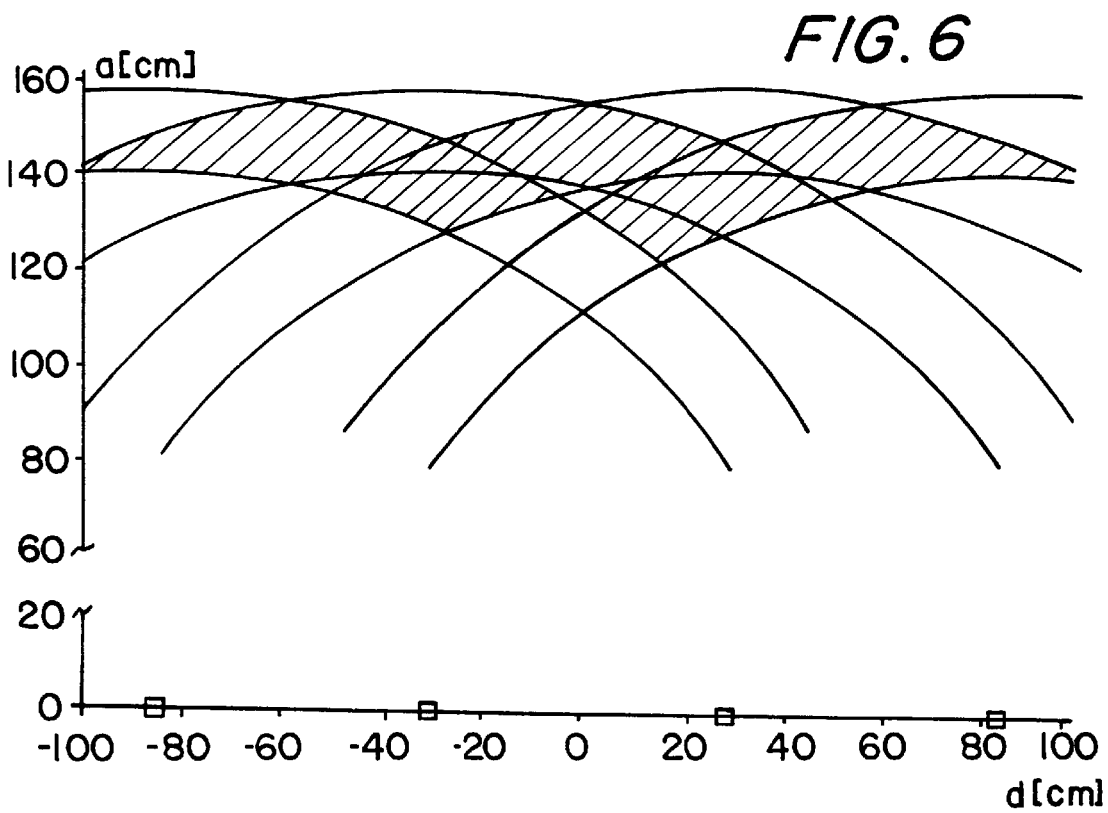
FIG. 6 is a graphical illustration of an ultrasonic wave front produced by simultaneous transmission of four ultrasonic transducers with a pulse duration of 600 $\mu$s.

In FIGS. 4 to 6 sound waves propagated from the sensors 7 to 10 are shown diagrammatically. The distance d from the longitudinal axis of the motor vehicle is given on the horizontal axis, while the distance a behind the vehicle is given on the vertical axis. The vertical axis is shown interrupted or broken because of space considerations on these figures.

FIG. 4 shows wave fronts of the sensors 7 to 10 (FIG. 2) for a distance of 140 cm. The four sensors have transmitted at the same time. Also circular segments parallel to the circular segments of FIG. 4 were introduced into the FIGS. 5 and 6, whereby the distance on both lines characterizes the pulse length. This pulse length amounts to 300 $\mu$s in FIG. 5 or about 10 cm, while the illustration according to FIG. 6 is based on doubled, thus longer, pulse length. Those parts of the space behind the motor vehicle which are detected by the ultrasonic pulses for several ultrasonic transducers, are shown shaded in FIGS. 5 and 6. A comparison of FIGS. 5 and 6 shows that in the embodiment of FIG. 6 substantially more area is simultaneously detected by the several sensors because of the increased pulse length. The probability of a reliable detection of the obstacle is thus increased in comparison to the case of FIG. 5.

The present invention is also described in German Patent Application 197 44 185.8 of Oct. 7, 1997, which is incorporated here by reference and forms the basis for a claim of priority under 35 U.S.C. 119 for the appended claims.

While the invention has been illustrated and described as embodied in an apparatus for measuring a distance by means of ultrasound, it is not intended to be limited to the details shown, since various modifications and structural changes may be made without departing from the spirit of the present invention.

Without further analysis, the foregoing will so fully reveal the gist of the invention that others can, by applying current knowledge, readily adapt it for various applications without omitting features that, from the standpoint of the prior art, fairly constitute essential characteristics of the generic and specific aspects of the present invention.

What is claimed is new and desired to be protected by Letters Patent is set forth in the appended claims:

1. An apparatus for measuring a distance to an object with ultrasound, said apparatus comprising a plurality of ultrasonic transducers (1 to 10); means for propagating a plurality of ultrasonic pulses from each of the ultrasonic transducers simultaneously toward the object so that the ultrasonic pulses from the respective ultrasonic transducers are superimposed on each other; a controller (13) connected to said ultrasonic transducers so that said ultrasonic transducers can be controlled and interrogated individually and a program in the controller for controlling a group of the ultrasonic transducers so that said ultrasonic pulses of said group are simultaneously generated and superimposed on each other: and means for receiving reflections of the superimposed ultrasonic pulses from said group after simultaneously generating the ultrasonic pulses, said means for receiving the reflections comprising at least one of the ultrasonic transducers (1 to 10).

2. The apparatus as defined in claim 1, further comprising means for propagating the superimposed ultrasonic pulses from all of said ultrasonic transducers in substantially the same direction.

3. The apparatus as defined in claim 1, further comprising means for sequentially propagating ultrasonic pulses from the respective ultrasonic transducers (1 to 10) in addition to the means for propagating the ultrasonic pulses simultaneously and means for receiving and evaluating reflections of the sequentially propagated ultrasonic pulses from said object.

4. The apparatus as defined in claim 3, further comprising means for alternating between said propagating said ultrasonic pulses simultaneously and said sequentially propagating the ultrasonic pulses.

5. An apparatus for measuring a distance to an object with ultrasound, said apparatus comprising
   a plurality of ultrasonic transducers (1 to 10):
   means for propagating a plurality of ultrasonic pulses from each of the ultrasonic transducers simultaneously toward the object so that the ultrasonic pulses from the respective ultrasonic transducers are superimposed on each other;
   means for sequentially propagating ultrasonic pulses from the respective ultrasonic transducers (1 to 10) in addition to the means for propagating the ultrasonic pulses simultaneously:
   means for receiving reflections of the superimposed ultrasonic pulses comprising at least one of the ultrasonic transducers (1 to 10) after propagation of the ultrasonic pulses;
   means for evaluating said reflections of the sequentially propagated ultrasonic pulses from said object; and
   means for controlling the propagating of the ultrasonic pulses by the ultrasonic transducers so that said propagating said ultrasonic pulses simultaneously occurs when no obstacle is detected during the sequentially propagating of the ultrasonic pulses.

6. An apparatus for measuring a distance to an object with ultrasound, said apparatus comprising
   a plurality of ultrasonic transducers (1 to 10);
   means for propagating a plurality of ultrasonic pulses from each of the ultrasonic transducers simultaneously toward the object so that the ultrasonic pulses from the respective ultrasonic transducers are superimposed on each other;
   means for sequentially propagating ultrasonic pulses from the respective ultrasonic transducers (1 to 10) in addition to the means for propagating the ultrasonic pulses simultaneously;
   means for receiving reflections of the superimposed ultrasonic pulses comprising at least one of the ultrasonic transducers (1 to 10) after propagation of the ultrasonic pulses;
   means for evaluating said reflections of the sequentially propagated ultrasonic pulses from said object; and
   means for arranging the ultrasonic transducers in a motor vehicle so that said distance is between a part of the motor vehicle and the object and means for alternating between said propagating said ultrasonic pulses simultaneously and said sequentially propagating the ultrasonic pulses according to a travel speed of the motor vehicle.

7. The apparatus as defined in claim 1, further comprising means for arranging the ultrasonic transducers in a motor vehicle so that said distance is between a part of the motor vehicle and the object.

8. The apparatus as defined in claim 6, wherein said part of the motor vehicle is a front portion (11) and/or a rear portion (12) and the ultrasonic transducers (1 to 6; 7 to 10) are mounted on the front portion (11) and the rear portion (12) and further comprising a controller (13) connected to said ultrasonic transducers so that said ultrasonic transducers can be controlled and interrogated individually and a program in the controller whereby groups of the ultrasonic transducers are operated and controlled to produce ultrasonic pulses simultaneously.

9. An apparatus for measuring a distance to an object with ultrasound, said apparatus comprising a plurality of ultrasonic transducers (1 to 10);
   means for propagating a plurality of ultrasonic pulses from each of the ultrasonic transducers simultaneously toward the object so that the ultrasonic pulses from the respective ultrasonic transducers are superimposed on each other;
   means for sequentially propagating ultrasonic pulses from the respective ultrasonic transducers (1 to 10) in addition to the means for propagating the ultrasonic pulses simultaneously;
   means for receiving reflections of the superimposed ultrasonic pulses comprising at least one of the ultrasonic transducers (1 to 10) after propagation of the ultrasonic pulses;
   a controller (13) connected to said ultrasonic transducers so that said ultrasonic transducers can be controlled and interrogated individually and a program in the controller whereby groups of the ultrasonic transducers are operated and controlled to produce said ultrasonic pulses simultaneously; means for arranging the ultrasonic transducers in a motor vehicle so that said distance is between a front portion (11) or a rear portion (12) of the motor vehicle and the object; and
   means for feeding the operating parameters of the motor vehicle to the controller (13), said means for feeding the operating parameters of the motor vehicle to the controller (13) comprising a bus system (17).

10. The apparatus as defined in claim 9, wherein the bus system comprises a CAN bus.

11. An apparatus for measuring a distance to an object with ultrasound, said apparatus comprising a plurality of ultrasonic transducers (1 to 10);

means for propagating a plurality of ultrasonic pulses from each of the ultrasonic transducers simultaneously toward the object so that the ultrasonic pulses from the respective ultrasonic transducers are superimposed on each other;

means for sequentially propagating ultrasonic pulses from the respective ultrasonic transducers (1 to 10) in addition to the means for propagating the ultrasonic pulses simultaneously;

means for receiving reflections of the superimposed ultrasonic pulses comprising at least one of the ultrasonic transducers (1 to 10) after propagation of the ultrasonic pulses;

a controller (13) connected to said ultrasonic transducers so that said ultrasonic transducers can be controlled and interrogated individually and a program in the controller whereby groups of the ultrasonic transducers are operated and controlled to produce said ultrasonic pulses simultaneously;

means for arranging the ultrasonic transducers in a motor vehicle so that said distance is between a front portion (11) or a rear portion (12) of the motor vehicle and the object; and wherein the controller (13) includes means for controlling a duration of the ultrasonic pulses so that said duration is longer during said propagating the ultrasonic pulses simultaneously than in a sequential propagation of said ultrasonic pulses from the ultrasonic transducers one after the other.

12. The apparatus as defined in claim 11, wherein said duration is 600 $\mu$s in said propagating simultaneously and 300 $\mu$s in said sequential propagation.

* * * * *